(12) United States Patent
Hornyak et al.

(10) Patent No.: US 8,786,664 B2
(45) Date of Patent: Jul. 22, 2014

(54) SYSTEM AND METHOD FOR PROVIDING INTEGRATED VIDEO COMMUNICATION APPLICATIONS ON A MOBILE COMPUTING DEVICE

(75) Inventors: Matthew Hornyak, San Francisco, CA (US); Bradford Vogel, San Francisco, CA (US); Lucas Wolf, Mountain View, CA (US); Anthony Goto, San Jose, CA (US); Justin Kodama, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 272 days.

(21) Appl. No.: 13/171,889

(22) Filed: Jun. 29, 2011

(65) Prior Publication Data
US 2012/0019610 A1 Jan. 26, 2012

Related U.S. Application Data

(63) Continuation-in-part of application No. 12/769,318, filed on Apr. 28, 2010, now Pat. No. 8,437,339.

(60) Provisional application No. 61/477,112, filed on Apr. 19, 2011.

(51) Int. Cl.
*H04N 7/14* (2006.01)

(52) U.S. Cl.
USPC ..................................... 348/14.03; 379/93.21

(58) Field of Classification Search
USPC ................... 379/93.21, 158, 202.01, 204.01; 348/14.01, 14.02, 14.03, 14.08, 14.11
See application file for complete search history.

(56) References Cited

U.S. PATENT DOCUMENTS

| | | |
|---|---|---|
| 7,409,208 B1 * | 8/2008 | Clare et al. ................... 455/419 |
| 8,131,267 B2 | 3/2012 | Lichorowic et al. |
| 8,437,339 B2 | 5/2013 | Wilkinson et al. |
| 2003/0039242 A1 | 2/2003 | Moore et al. |
| 2004/0120473 A1 | 6/2004 | Birch et al. |
| 2005/0091058 A1 | 4/2005 | Biettron et al. |
| 2005/0111439 A1 | 5/2005 | Yarlagadda et al. |
| 2008/0032747 A1 | 2/2008 | Holt et al. |
| 2009/0258635 A1 | 10/2009 | Holt et al. |
| 2010/0039395 A1 * | 2/2010 | Nurmi et al. .................. 345/173 |
| 2010/0039495 A1 * | 2/2010 | Rahman et al. ............ 348/14.08 |
| 2010/0177882 A1 | 7/2010 | Taylor et al. |

(Continued)

FOREIGN PATENT DOCUMENTS

| | | |
|---|---|---|
| KR | 20050117398 A | 12/2005 |
| KR | 100738554 B1 | 7/2007 |

OTHER PUBLICATIONS

International Search Report and Written Opinion, International Application No. PCT/US2011/034137, Date of Mailing: Nov. 28, 2011, pp. 1-9.

*Primary Examiner* — Olisa Anwah
(74) *Attorney, Agent, or Firm* — Mahamedi Paradice LLP

(57) ABSTRACT

A system and method for operating a mobile computing device is disclosed. A processor for the mobile computing device is configured to present a user interface for a core application of the mobile computing device. The user interface enables a user to select a third party communication application from the user interface of the core application. The selected third party communication application is executed to enable the user to initiate a communication session with another user using the services of the selected third party communication application.

20 Claims, 17 Drawing Sheets

(56) References Cited

U.S. PATENT DOCUMENTS

2011/0086623 A1* 4/2011 Patterson et al. .......... 455/414.2
2011/0249073 A1* 10/2011 Cranfill et al. ............. 348/14.02
2012/0046069 A1* 2/2012 Cupala et al. .............. 455/550.1

* cited by examiner

SYSTEM AND METHOD FOR PROVIDING INTEGRATED VIDEO COMMUNICATION APPLICATIONS ON A MOBILE COMPUTING DEVICE

RELATED APPLICATIONS

This application is a continuation in part of U.S. patent application Ser. No. 12/769,318 filed on Apr. 28, 2010 now U.S Pat. No. 8,437,339, entitled TECHNIQUES TO PROVIDE INTEGRATED VOICE SERVICE MANAGEMENT, and claims the benefit of priority under 35 U.S.C. 119(e) to Provisional Application Ser. No. 61/477,112, filed Apr. 19, 2011, titled SYSTEM AND METHOD FOR PROVIDING INTEGRATED VIDEO COMMUNICATION APPLICATIONS ON A MOBILE COMPUTING DEVICE. The aforementioned applications are hereby incorporated by reference in their entirety.

TECHNICAL FIELD

The disclosed embodiments relate generally to the field of operating mobile computing devices. In particular, embodiments described herein pertain to a system and method for integrating third party communication applications with various core applications of a mobile computing device.

BACKGROUND OF THE INVENTION

With the recent development of technology over the past few years, mobile computing devices, such as smart phones, have been drastically improved to allow for a variety of different communication methods. For example, not only can smart phones be used for making standard telephone calls, but they can also be used for email services, text messaging, instant messaging, and web access, among other services.

Typically, a cell phone carrier enables a user to make a phone call to another wired device or wireless device over a cellular network (for wired devices, also partially over the Public Switched Telephone Network (PSTN)). However, with the development and improvement of Voice Over Packet (VOP) services, such as Voice Over Internet Protocol (VoIP), various communication methods may be allowed over both wireless and wired data networks. VOP services allow for the transmission of voice communications over internet protocol networks, such as the Internet.

With the improvement of such services, a user may choose to use different communication transports that use VOP services for communicating with other users. For example, a user may download various applications to his or her mobile computing device, including third party communication applications. A user may use a third party message application to send and receive text messages, for example, from another user. Because there may be a number of different applications that a user can download to his or her device, what is needed is a system to integrate the different communication applications with various operating system resources of the mobile computing device. This can allow for a more efficient and improved use of communication applications on the device.

BRIEF DESCRIPTION OF THE DRAWINGS

The disclosure herein is illustrated by way of example, and not by way of limitation, in the figures of the accompanying drawings and in which like reference numerals refer to similar elements, and in which.

DETAILED DESCRIPTION

Figure 1:
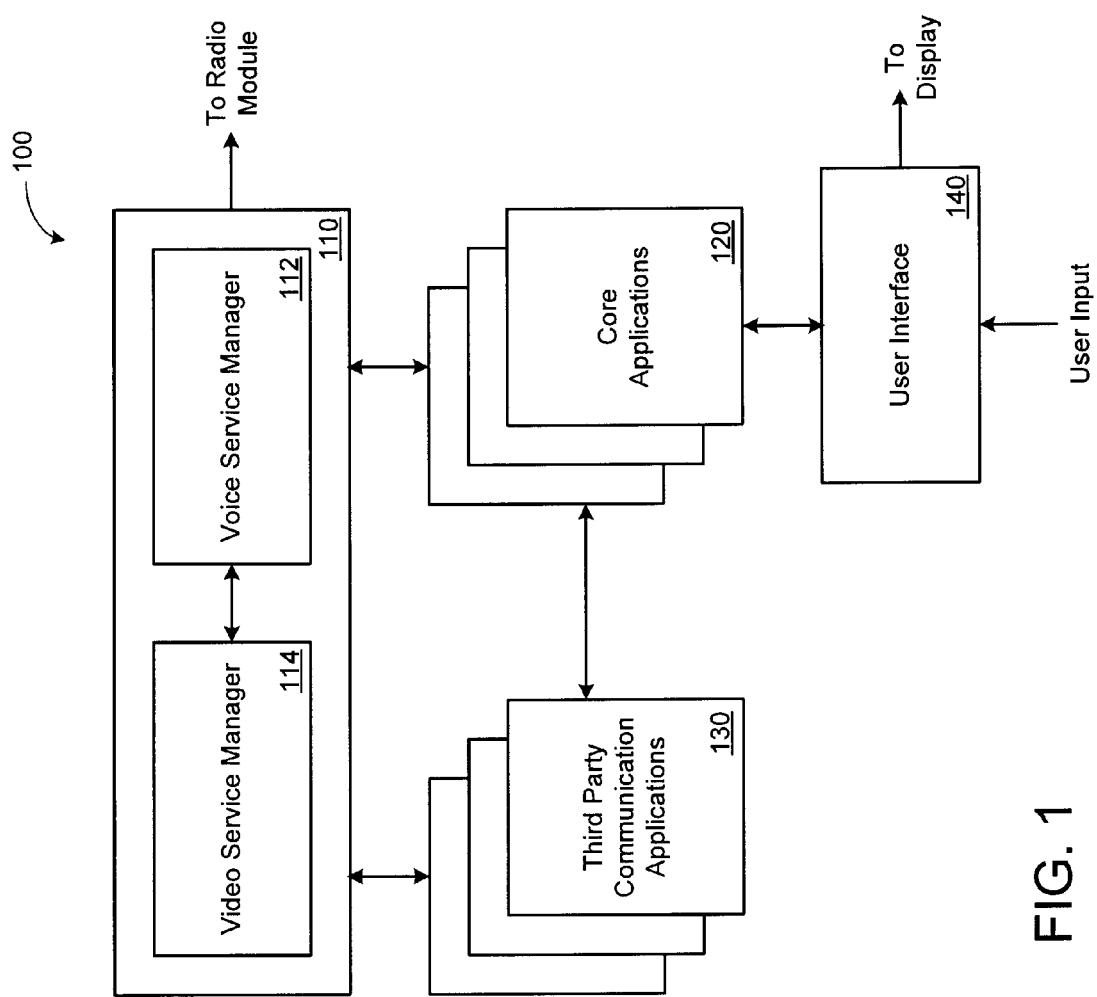
FIG. 1 illustrates a logic diagram for operating a mobile computing device under an embodiment.

Embodiments described herein include a mobile computing device that provides various user interfaces for enhancing the functionality of the mobile computing device. According to some embodiments, third party communication applications are integrated with applications that are provided as part of the operating system ("core applications") of the mobile computing device. Among other uses, the various user interfaces that correspond to core applications of the mobile computing device may be used to access different third party communication transports for initiating communication sessions. A user may access some or all of the features of the third party communication applications from the core application user interfaces of the mobile computing device. This may provide a more efficient and enhanced user experience.

Embodiments enable multiple resident or core applications to include a user interface feature from which a third-party communication application can be executed. More specifically, embodiments enable a third-party/proprietary application to be executed by operating a core application. In some embodiments, user-interface features associated with a third party application are integrated into the user-interface of the core application. Still further, in some embodiments, core applications can be used to launch third-party communication applications using primarily (e.g., the framework) the user interface of the core application. For example, the user-interface of the core application may carry one or more features for using and integrating the third-party application. When the third-party application is executed, the other user-interface features of that application may be suppressed and/or made non-functional.

In some embodiments, core applications of the mobile computing device may include applications that are incorporated with or come standard with the mobile computing device. For example, a typical or exemplary set of core applications for multi-functional telephony device include phone, contact records, calendar and messaging. Depending on the core application selected by a user, such as a phone application, the mobile computing device may present a user interface corresponding to the selected core application. The user interface includes selectable features to enable a user to select a third party communication application to make or initiate a communication session, such as a video call, from the core application user interface. The mobile computing device may communicate with another device by using a communication service transport corresponding to the selected third party application.

According to an embodiment, in response to the user selecting a third party communication application from the user interface of a core application, the selected third party communication application is executed by the mobile computing device. With execution of the third-party application, a user can operate the mobile computing device without the user having to separately open or launch a third party communication application to perform a communication session with another device.

Additionally, some embodiments enable one or more of the core applications to control the communication sessions that are made using the third party applications and corresponding service transports. The user may make a video call using a third party service transport, for example, from the phone application of the mobile computing device. The user may also make the selection by selecting a graphic representation that corresponds to that third party communication service transport.

Third party communication applications may include a variety of different applications, such as applications that provide voice communication services. In some embodiments, third party communication applications may include video communication applications that allow for video calling between users on two different devices. Upon selecting a third party video communication service from a user interface of the mobile computing device, the third party video communication application can be executed to initiate a video communication session (e.g., a video call).

In other embodiments, the user interfaces of the mobile computing device may vary depending on the corresponding application. The standard or core applications of the mobile computing device can include a phone application, a messaging application, a contacts application, a calendar application or a search application. For example, a phone application may include a call log that provides a list of communication sessions that were initiated or received by the user during a period of time. The list may include both voice and video communication sessions using services provided by a carrier (e.g., the cell phone service provider of the mobile computing device) or by any of the different third party communication applications downloaded by a user.

In various embodiments, the system may allow third party developers who develop (or provide service for) various third party communication applications to modify the user interfaces of the core applications. The third party developer may, for example, customize the selectable graphic representation on the user interfaces to include their logo. In other embodiments, the third party developer may provide for additional features or options for the user interfaces of the applications of the mobile computing device.

Some embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component can exist on a hardware component independently of other modules/components or a module/component can be a shared element or process of other modules/components, programs or machines. A module or component may reside on one machine, such as on a client or on a server, or a module/component may be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, the implementation of a system provided for in this application may require use of memory, processors and network resources, including data ports, and signal lines (optical, electrical, etc.), unless stated otherwise.

Some embodiments described herein may generally require the use of computers, including processing and memory resources. For example, systems described herein may be implemented on a server or network service. Such servers may connect and be used by users over networks such as the Internet, or by a combination of networks, such as cellular networks and the Internet. Alternatively, one or more embodiments described herein may be implemented locally, in whole or in part, on computing machines such as desktops, cellular phones, personal digital assistances, laptop computers, tablet devices, or other computing devices. Thus, memory, processing and network resources may all be used in connection with the establishment, use or performance of any embodiment described herein (including with the performance of any method or with the implementation of any system).

Furthermore, some embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

Overview

FIG. 1 illustrates a logic diagram for a system for operating a mobile computing device under an embodiment. The logic diagram of the system in FIG. 1 may be implemented on, for example, a mobile computing device. Implementation of the system may require use of memory resources, processing resources and network resources (including data ports and signal lines) of the mobile computing device.

FIG. 1 provides an overview of a system 100 that is configured to provide user interfaces for core applications that include various features of third party communication services under an embodiment. The system 100 is configured to support various service features offered by different voice and video service transports. The system 100 provides various user interfaces for different core applications of a mobile computing device. The user interface of a core application may include features of the core application as well as various features provided by one or more third party communication applications. The user interface 140 enables a user to operate a third party communication application 130 from the user interface of a core application. For example, with the selection of a communication application 130, the user may also implicitly select a service transport associated with the communication application to initiate a communication session. In this manner, a user may access third party communication services from various core applications of the mobile computing device without having to individually launch or open a third party communication application.

As examples, the mobile computing device can correspond to any device that includes roaming wireless network and/or telephony capabilities, including cellular telephony devices and/or mobile messengers. In particular, embodiments described herein may apply to numerous kinds of mobile or small form-factor computing devices. One type of mobile computing device that may be configured to include embodiments described herein includes a computer telephony device, such as a cellular phone or mobile device with voice-telephony applications (sometimes called "smart phone"). A computing device such as described may be small enough to fit in one hand, while providing cellular telephony features in combination with other applications, such as messaging, web browsing, media playback, personal information management (e.g., such as contact records management, calendar applications, tasks lists), image or video/media capture and other functionality. Mobile computing devices in particular may have numerous types of input mechanisms and user-interface features, such as keyboards or keypads, mufti-directional or navigation buttons, application or action buttons, and contact or touch-sensitive display screens. Some devices may include combinations of keyboard, button panel area, and display screen on one facade. The button panel region may occupy a band between the keypad and the display area, and include a navigation button and multiple application buttons or action buttons.

Specific types of messaging that may be performed include messaging for email applications, Short Message Service (SMS) messages, Multimedia Message Service (MMS) messages, and proprietary voice exchange applications (such as SKYPE). Still further, other types of computing devices contemplated with embodiments described herein include laptop or notebook computers, ultra-mobile computers, personal digital assistants, and other multi-functional computing devices or mobile/portable devices.

Still further, one or more embodiments may be implemented through any type of computing device such as a desktop computer that is configured to include real-time voice data exchange (e.g. through use of Internet Protocol telephony). Still further, other types of computer telephony devices exist, including standalone devices that connect directly to a telephone network (whether Internet Protocol or Public Switch Telephony System (PSTN)) and provide software interfaces and applications.

In one embodiment, system 100 includes a service manager 110 that manages various communication services on a mobile computing device. The service manager 110 may communicate with core applications 120 of the mobile computing device and third party communication applications 130 that are downloaded by a user. The service manager 110 also communicates with radio resources of the mobile computing device to communicate with the service transports wirelessly. In some embodiments, one or more third party communication applications 130 may be originally included with the mobile computing device. Core applications 120 may also communicate with the user interface component 140 so that user interfaces of core applications 120 may be presented on a display of the mobile computing device.

As described herein, core applications 120 may include applications that are originally included with a mobile computing device (e.g., come standard with the device) or may include applications that are necessary for communication functionalities. For example, core applications 120 may include, without limitation, a phone application, messaging applications, contacts application, and a search application. In other embodiments, core applications 120 may also include a web browsing application, personal information management applications (e.g., calendar, scheduling, tasks, notes, clock), word processing applications, media applications (e.g., photos, camera, music), and game applications.

The user interface component 140 may receive information from various applications in order to display user interfaces corresponding to the applications. Depending on the application, a user interface that is generated by the user interface component 140 may include selectable and non-selectable icons, graphics, buttons, menu choices, or any other images. The user interface component 140 may receive user commands via a user input (e.g., a touch screen, keypad, scroll wheel, etc.) to enable navigation and selection. The user interface component 140 may also communicate with third party communication applications 130. For example, if a user individually launches a third party communication application 130 (e.g., from an application launcher page), the user interface corresponding to the launched third party communication application may also be generated and provided on the display of the mobile computing device.

As discussed, a service manager 110 manages various communication services for the mobile computing device. The service manager 110 includes a voice service manager 112 and a video service manager 114 that communicate with each other. In some embodiments, the voice service manager 112 and the video service manager 114 may be combined to provide the service manager 110. The service manager 110 is configured to manage different types of service features that are associated with various service transports.

A communication service transport may be a message service transport and/or voice service transport and/or a video service transport. As discussed, one example of a message and voice communication service transport is a carrier that may provide text messaging and voice services to a user. Other examples of service transports include third party transports, such as SKYPE and GOOGLE VOICE. In some embodiments, a service transport may provide both voice and video communication services, such as SKYPE and GOOGLE VOICE. These service transports are developed and provided by third party developers (e.g., not the carrier of a user's cell phone service) who may provide services to a user.

According to an embodiment, the voice service manager 112 may manage voice service features, while the video service manager 114 may manage video service features (e.g., video calling services). The service manager 110 communicates with the radio module of the mobile computing device to enable communications between the mobile computing device and the various communication service transports. For example, service features associated with voice and video service transports, such as a carrier (e.g., a provider of cellular telephone services to a user), may include voice or video calling services, voicemail services, messaging services, caller-ID services, call forwarding, call switching, call blocking, text transcription, video conferencing, etc. The service manager 110 enables a user to access a core application and also communicates with a cellular and/or data networks so that the user may use a video or voice service transport and its associated service features. The service manager 100 may establish a voice or video communication session with another device over a wireless communication network using the selected service transport.

In one embodiment, one or more service transports may be a transport that uses a Voice Over Packet (VOP) service. The VOP service implements transmission technologies for delivery of voice and data service features over a packet-switched network, such as a Voice Over Internet Protocol (VoIP), IP telephony, Internet telephony, Voice Over Broadband (VoBB), broadband telephony, etc. Examples of VOP service transports includes web-based voice and data services, such as SKYPE and GOOGLE VOICE. Other transports may also be available.

A user may download, from an application catalog, different third party voice and video communication applications that may be used with corresponding service transports. These third party communication applications 130 are stored on the mobile computing device. For example, a user may download the SKYPE application from the application catalog so that the SKYPE application is stored on the user's mobile computing device. While accessing a core application, the user may make a phone call (a voice communication session) or send a message over VoIP using the user's SKYPE account (e.g., through use of the SKYPE application). Similarly, the user may make a video call (a video communication session) using the SKYPE application. While voice service transports and corresponding applications may be managed by the service manager 110, some embodiments provided may discuss only video service features and transports for simplicity purposes.

Core applications 120 may access various service features provided by video service transports via the third party communication applications 130 and the service manager 110. In some embodiments, core applications 120 may communicate with third party communication applications 130 directly or via the service manager 110. In this manner, core applications 120 may integrate features from third party communication applications 130, so that a user may access service features from various service transports by using a core application 120. For example, the contacts application may incorporate a user's SKYPE account so that the user's friends and contacts may be automatically added to the contacts on the mobile computing device. The user may navigate the user interface corresponding to the contacts application, and see contacts for friends who also have SKYPE. In another example, the user interface for a contacts application may include a video call icon for a contact record with a corresponding identifier for the service transport.

In some embodiments, core applications 120 may provide data to the user interface component 140 so that a user interface feature for a core application 120, such as a phone application, may be presented on the display of the mobile computing device. The user may navigate the user interface of the phone application and see integrated features from various third party communication applications 130. The user may choose to make a video call, for example, by selecting a third party communication application 130 to initiate the video call with another user. The user interface component 140 receives user input (e.g., selection and navigation input), which enables the corresponding core application to perform an action, such as connect the video call using the third party service transport. The phone application may communicate with the selected third party communication application to trigger or enable the communication to occur.

According to an embodiment, the service manager 110 exchanges control information between core applications 120 and third party communication applications 130, and also communicates with the various service transports via the radio module. In some embodiments, the service manager 110 may provide a set of application programming interfaces (APIs) that allow video service transports to provide a list of capabilities, services and notifications to the service manager 110 (via the third party communication applications 130) so that the core applications 120 may control the video service features automatically. The APIs may enable the third party communication applications 130 to plug into the core applications 120. Examples of core applications 120 with integrated third party communication applications 130 may be seen in FIGS. 3-16.

The third party communication applications 130 may enable a user to make video phone calls with another user. However, instead of operating the application individually (e.g., launching the application from a launcher page), the user may use the phone application or contacts application (or other core applications 120) to use a third party communication application, as discussed above. In such embodiments, the user interface of the third party communication application may be disabled or suppressed when its services are being used to communicate with the corresponding service transports. For example, if a user is making a video call from the phone application using her SKYPE account, the SKYPE application is being used to provide the video calling service. However, the user interface feature corresponding to the actual SKYPE application is not presented on the display of the mobile computing device because it is suppressed. In this manner, the user may view the video calling service to be fully integrated with the core applications 130 of the mobile computing device. On the other hand, if the user launches or uses a third party communication application independently of a core application, the user interface of the third party communication application would not be disabled or suppressed.

In other embodiments, APIs may be provided by system 100 to allow the third party communication applications 130 to modify the user interfaces of the core applications 120. Third party developers may program their application so that when the application is downloaded to the mobile computing device, the user interface features of the core applications 120 may be automatically modified to include various images, such as a logo (e.g., SKYPE logo), or other features for accessing or controlling the video services. Extra features may be provided to the phone application, for example, that have not been present previously (e.g., an icon for video calling, preferences for settings for video calling, altering video sizes and video windows). Allowing the third party developer to customize the user interface features and add in controls allows a user to fully control the video call from the core applications. Other examples include changing the look and feel of the variety of different user interfaces or allowing advertisements while the service is being used.

In some embodiments, because the third party communication applications 130 may be downloaded from an application catalog, the application catalog may be used by a third party developer as a delivery mechanism for their voice and video services. The third party developer may include features to modify the user interface features of the core applications 120. For example, the system 100 may provide APIs that allow the voice and video calling applications to automatically modify different UIs. The third party developer may, for example, have customization data included with the third party communication applications 130.

Flow Chart

Figure 2:
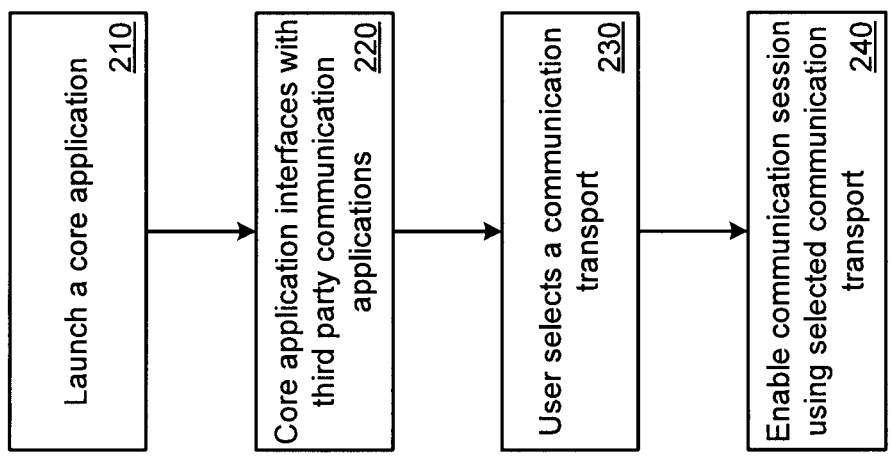
FIG. 2 is a flow chart illustrating a method for operating a mobile computing device under an embodiment.

FIG. 2 is a flow chart illustrating a method for operating a mobile computing device, according to one or more embodiments. A method such as described with FIG. 2 may be implemented using, for examples, elements shown and described with FIG. 1. As such, references to elements of FIG. 1 are intended to illustrate only suitable elements for performing a step or sub-step being described. Steps or sub-steps described may be performed by one or more processors of the mobile computing device using various programmatic elements. In some embodiments, the order of the steps or sub-steps may be changed.

According to an embodiment, in step 210, a user may launch or open a core application of the mobile computing device. As discussed, an example of a core application may be a phone application that enables a user to make or receive a phone call. Upon launching the core application, the user interface corresponding to the core application is presented on the display of the mobile computing device. The user interface of the phone application, for example, may vary depending on the whether the user wants to enter in a phone number, search for a number, or look at a call log showing past communication sessions (voice or video calls initiated or received by the user).

In step 220, the core application may be executed in a manner that integrates user interface features of a third party communication application. To this end, the third-party communication application may be launched or utilized from the user interface of the core application. The core application is integrated with the various third party communication applications so that a user may access the third party communication applications from the user interface of the core application. For example, if the user has downloaded SKYPE and GOOGLE VOICE, some phone application user interfaces may present a graphic representation for each of them. If the user types in a friend's name in the phone application and that friend is a contact on the user's SKYPE account, a SKYPE graphic representation (e.g., the name "SKYPE" or icon) may be provided with the friend's name.

In one embodiment, the user may select a third party communication transport to initiate a communication session from the user interface of the core application (step 230). The user may choose out of a variety of choices, such as the carrier voice or video service transport or other third party transports, that are provided on the user interface. Referring back to the example above, if the user wants to call his friend using SKYPE, the user may select the graphic representation for SKYPE. In some embodiments, even if the other user (in this example, the user's friend) does not have a SKYPE account, the user may still use the SKYPE transport to make the call (either voice or video) depending on compatibility. For example, a user can use SKYPE to make a phone call to a wired landline phone.

Upon selection of the communication transport, the preferred communication session is enabled (step 240). The user may perform a voice call or video call using the selected transport. For example, because the user wanted to call his friend using SKYPE, the SKYPE application stored on the mobile computing device enables the user to communicate with the corresponding SKYPE transport. In some embodiments, because the user is performing the call using the core application, the user interface of the SKYPE application is not presented on the display of the mobile computing device. As discussed previously, the SKYPE application features may be suppressed even though it is being used to perform the communication session.

Although the steps in FIG. 2 were described with reference to one particular exemplary application, the steps apply to a variety of different applications. In addition, in some embodiments, the steps may be rearranged or may be performed in different order or concurrently.

User Interfaces

FIGS. 3-16 illustrate various user interfaces for operating a mobile computing device. The illustrations provided with FIGS. 3-16 may be implemented using, for example, elements shown and described with FIGS. 1 and 2. As such, reference to elements of FIGS. 1 and 2 is intended for illustration purposes. In addition, although embodiments described with FIGS. 3-16 are discussed with respect to touch screen displays, other input methods are possible (e.g., keyboard, scroll wheels) for navigating user interfaces and selecting different options, menus, buttons, etc.

Figure 3:
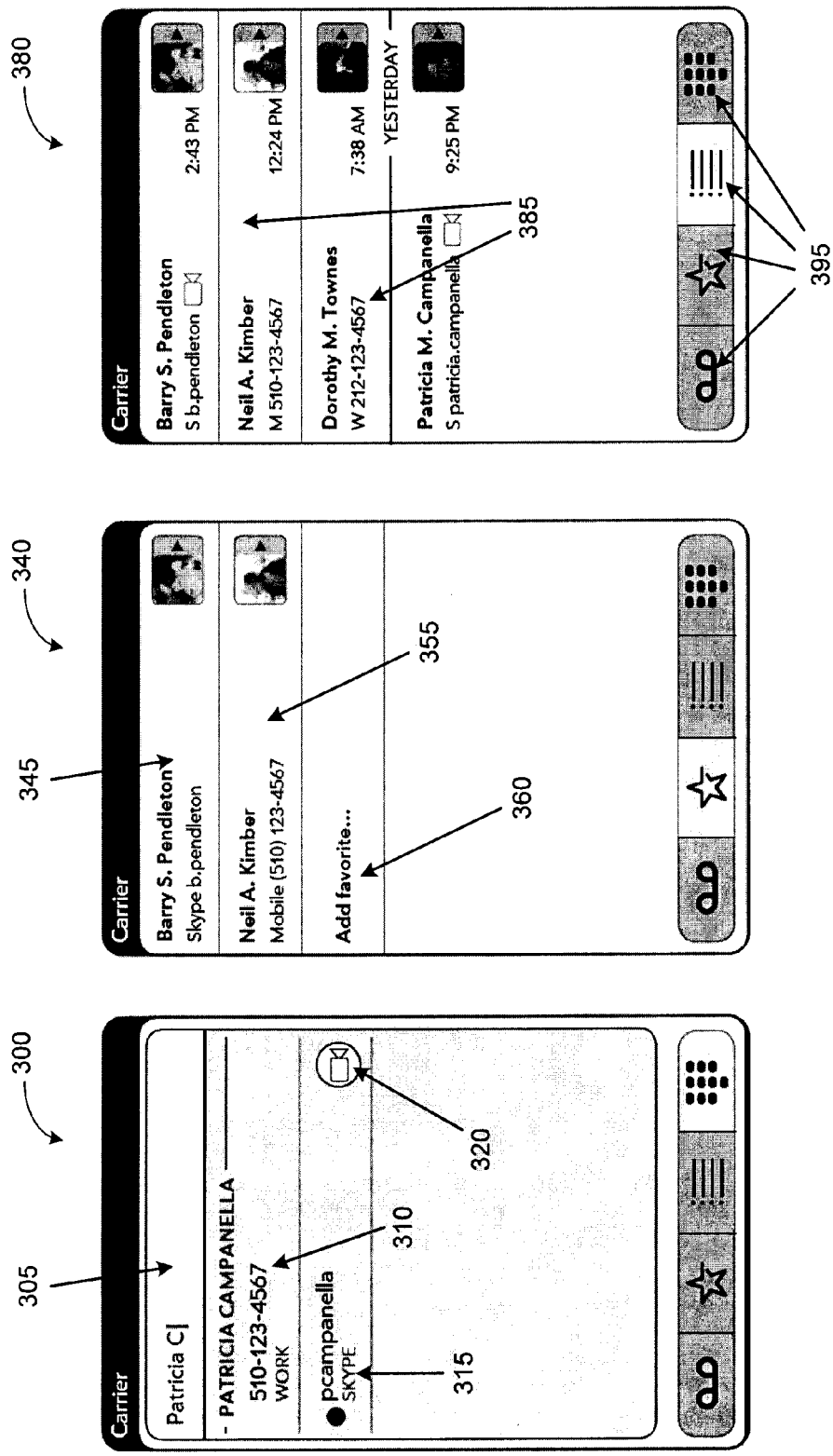
FIG. 3 illustrates a user interface for a phone application, according to an embodiment.

FIG. 3 illustrates a user interface for a phone application, according to an embodiment. View 300 illustrates an address user interface (UI) of the phone application in which a user may type a phone number or the name of a contact. In the example provided, the user has started to type in the name "Patricia Campanella" in the search portion 305 of the UI. The mobile computing device may show results that match the query input dynamically, as the user types. In view 300, a contact record for Patricia Campanella is displayed in the region below the search portion 305. Two record objects 310, 315 are provided with the contact record. The record objects 310, 315 each display a contact identifier. Record object 310 displays a telephone number, while the record object 315 displays a SKYPE identifier, such as a SKYPE user name.

In some embodiments, the record objects 310, 315 may also include metadata that may be displayed with the record objects 310, 315. The record object 310 indicates that the telephone number listed is for Patricia Campanella's work phone. Similarly, the record object 315 indicates that the user name "pcampanella" corresponds to Patricia Campanella's SKYPE account.

As discussed above, because the system integrates various third party communication applications, such as SKYPE, with core applications of the mobile computing device, the user may use the phone application to access one or more third party communication applications. In the example provided, the user has already downloaded the SKYPE application to his or her mobile computing device. The user may make a SKYPE phone call to Patricia Campanella by selecting (e.g., tapping with a finger or pointer on a touch screen display) the record object 315. In other embodiments, the user may make a SKYPE video call to Patricia by selecting the video call icon 320. Once the call (either voice or video) is initiated, a different UI view is provided to show that the call is being connected.

Additional record objects may be provided with the contact record if the user has additional third party communication applications installed on his or her device. For example, if the user has multiple third party communication applications downloaded (e.g., SKYPE and GOOGLE VOICE) and Patricia Campanella is in the user's buddy list or contacts for both the SKYPE and GOOGLE VOICE accounts, then additional record objects may be provided.

View 340 illustrates a favorites UI of the phone application. In the favorites UI view, different record objects 340, 345 are shown for contacts that the user has tagged or determined to be his or her favorite contacts to call. Record object 340 shows the name ("Barry S. Pendleton") of the contact, the contact identifier ("b.pendleton") and metadata corresponding to the service transport ("Skype"). The user may also add more favorites by selecting the option 360. In some embodiments, the user may select the record object 340 to make a SKYPE call (video or voice) to the contact listed using the selected third party communication application and corresponding service transport.

In view 380, a video call UI of the phone application is illustrated. The video call UI provides record objects 385 for video calls and voice calls initiated or received during a period of time. Each record object 385 includes a contact name, contact identifier, a time, an image, and metadata corresponding to the service transport (e.g., "S" for SKYPE, "M" for Mobile, "W" for work, etc.). The record objects 385 may include a video call icon 390 for video communication sessions. In some embodiments, the video call icon 390 may be included with a record object 385 even if the video call was only a partial communication session (e.g., the user switched from video to voice, or vice versa during the call).

The phone UIs that are provided with views 300, 340 and 380 also include graphic options 395 provided below to switch between the different phone UIs. For example, a user may select the star graphic option 395 for the favorites UI view.

Figure 4:
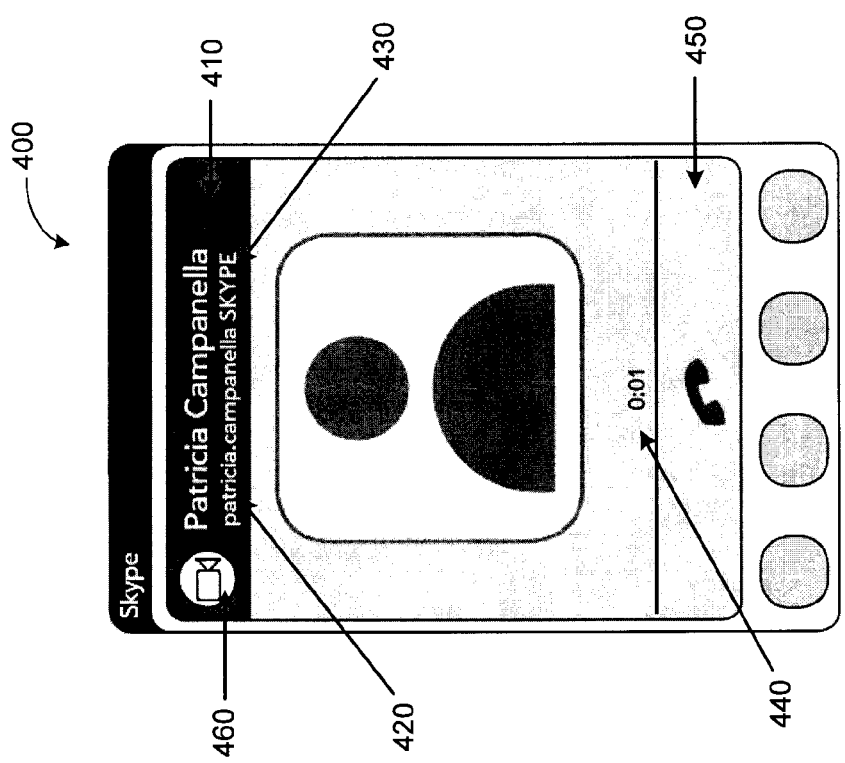
FIG. 4 illustrates a user interface for a phone application for an ongoing communication session, according to an embodiment.

FIG. 4 illustrates a user interface for a phone application for an ongoing communication session, according to an embodiment. In view 400, a communication session has already been initiated by a user or by the other user on the other device, Patricia Campanella. In the example provided, a SKYPE phone call has been made. The UI for an ongoing call includes the contact's name 410 (or number if it's a phone number without a saved contact), the contact identifier 420 ("patricia.campanella"), metadata for the service transport being used 430 ("SKYPE"), a timer 440 to show the duration of the communication session, an end call button 450, and a video call icon 460. In one embodiment, the user may select the video call icon 460 to convert the phone call to a video call during the communication session using the same voice and video service transport (SKYPE). The call does not drop when the transition occurs. The user may also convert back from the video call to a phone call.

Figure 5:
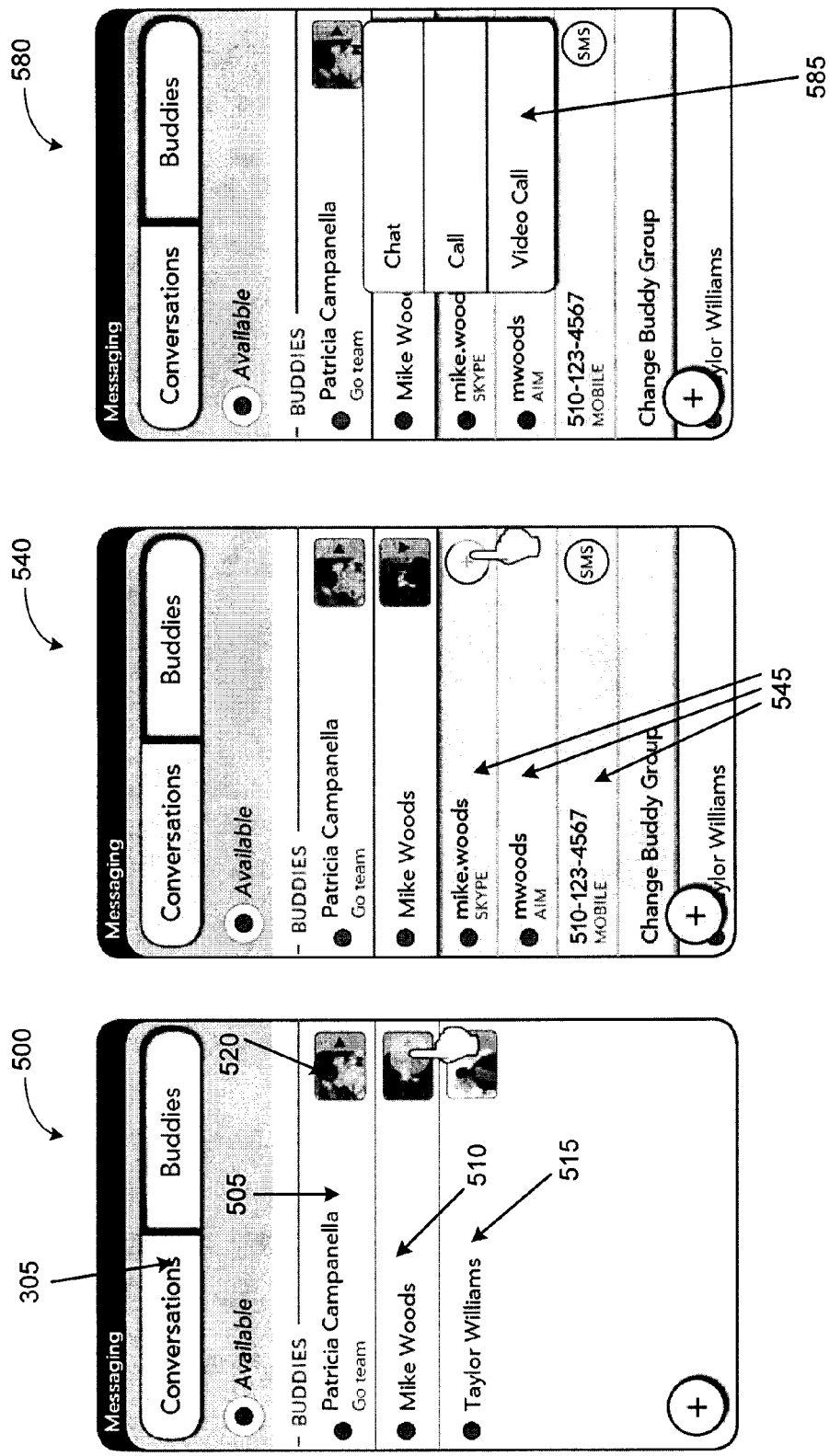
FIG. 5 illustrates a user interface for a messaging application under an embodiment.

FIG. 5 illustrates a user interface for a messaging application under an embodiment. View 500 shows a messaging application showing a list of buddies that are currently available. Three available contact objects 505, 510, 515 are provided. A user may tap on the images 520 provided on the contact objects (with the triangle) to expand the contact objects. For example, in view 500, the user may select the image 520 for "Mike Woods" to expand the contact object.

Again, because the system integrates third party communication applications, such as SKYPE and AIM, with core applications (e.g., messaging application) of the mobile computing device, the user may use the messaging application to access one or more third party communication applications. In view 540, after the contact object 510 has been expanded, record objects 545 are displayed on the UI. The user may initiate a communication session by selecting a record object 545, or if more than one communication session is available for a transport (such as for SKYPE), an option is provided for the user to make another selection. The user is selecting the button with the "+" sign to see more options.

In view 580, in response to the user selecting the "+" sign, an option window 585 is provided. Because the SKYPE transport enables messaging, voice calls, and video calls, the option window 585 allows a user to select a communication session from the messaging application (e.g., without having to individually and separately open/launch the SKYPE application from a launch page or home page). The user may select "Video Call" to initiate a video call with Mike Woods.

Figure 6:
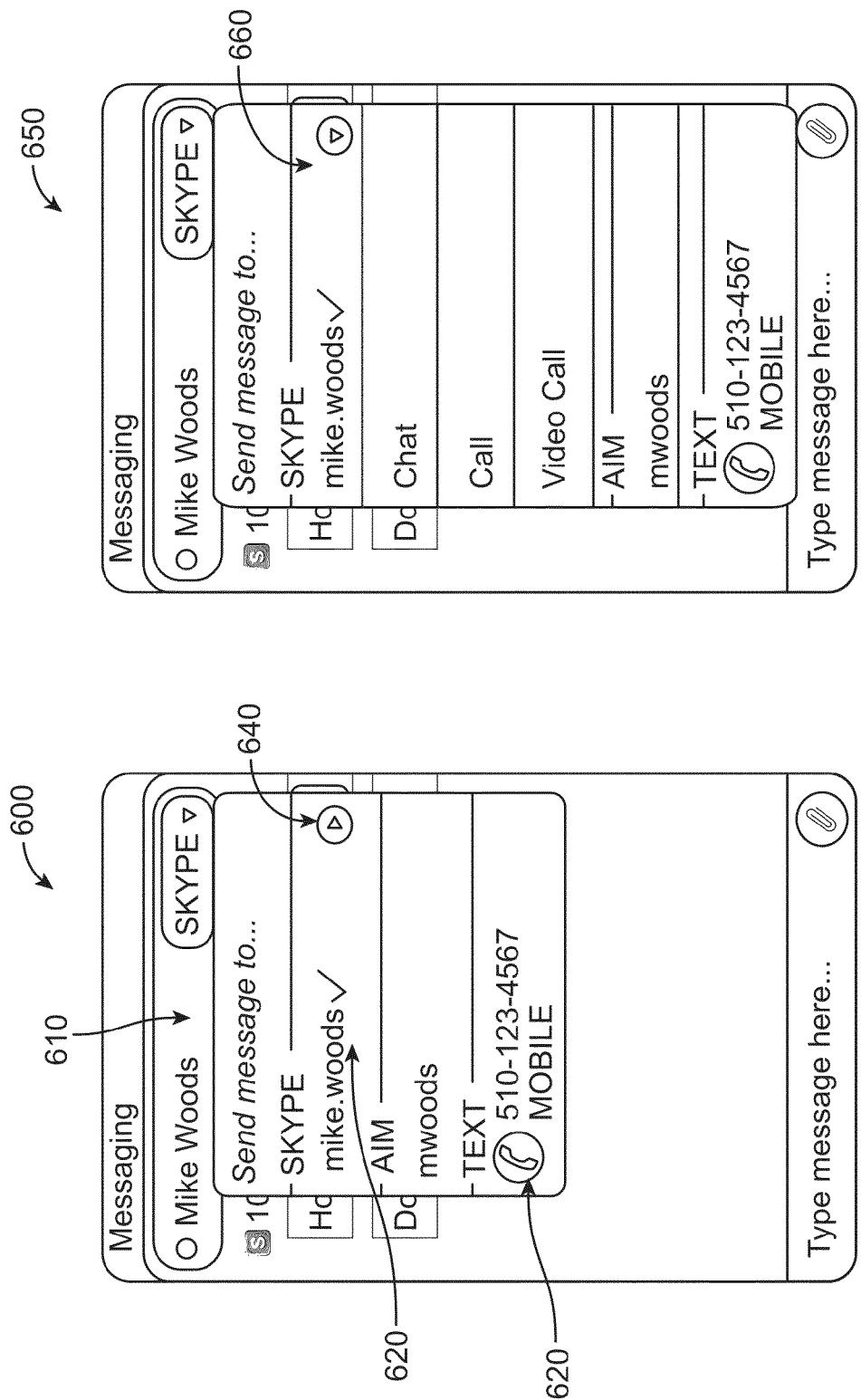
FIG. 6 illustrates another user interface for a messaging application under another embodiment.

FIG. 6 illustrates another user interface for a messaging application under another embodiment. FIG. 6 illustrates a method of initiating a video call from a UI of a messaging conversation (e.g., via SKYPE) between the user and Mike Woods. In view 600, the user has been messaging Mike Woods using SKYPE. The service transport being used is shown in the bar 610. The user may select the button or icon for the transport to open an option window 620 to select another transport or a different communication session using a third party communication transport. For example, in view 610, a user is already messaging Mike Woods on SKYPE. This is shown by the check mark 630. The user may change the way in which he communicates with Mike Woods (e.g., choose a different communications service transport), such as text using AIM or text using the carrier depending on preference.

In some embodiments, the user may also expand the window by selecting an icon 640 to show other options for a communication session. For example, the user may expand the SKYPE contact object 660 to show an expanded window for either messaging, voice calling, or video calling Mike Woods using the SKYPE transport. In this manner, the user may access the third party communication transport from the messaging application of the mobile computing device.

Figure 7:
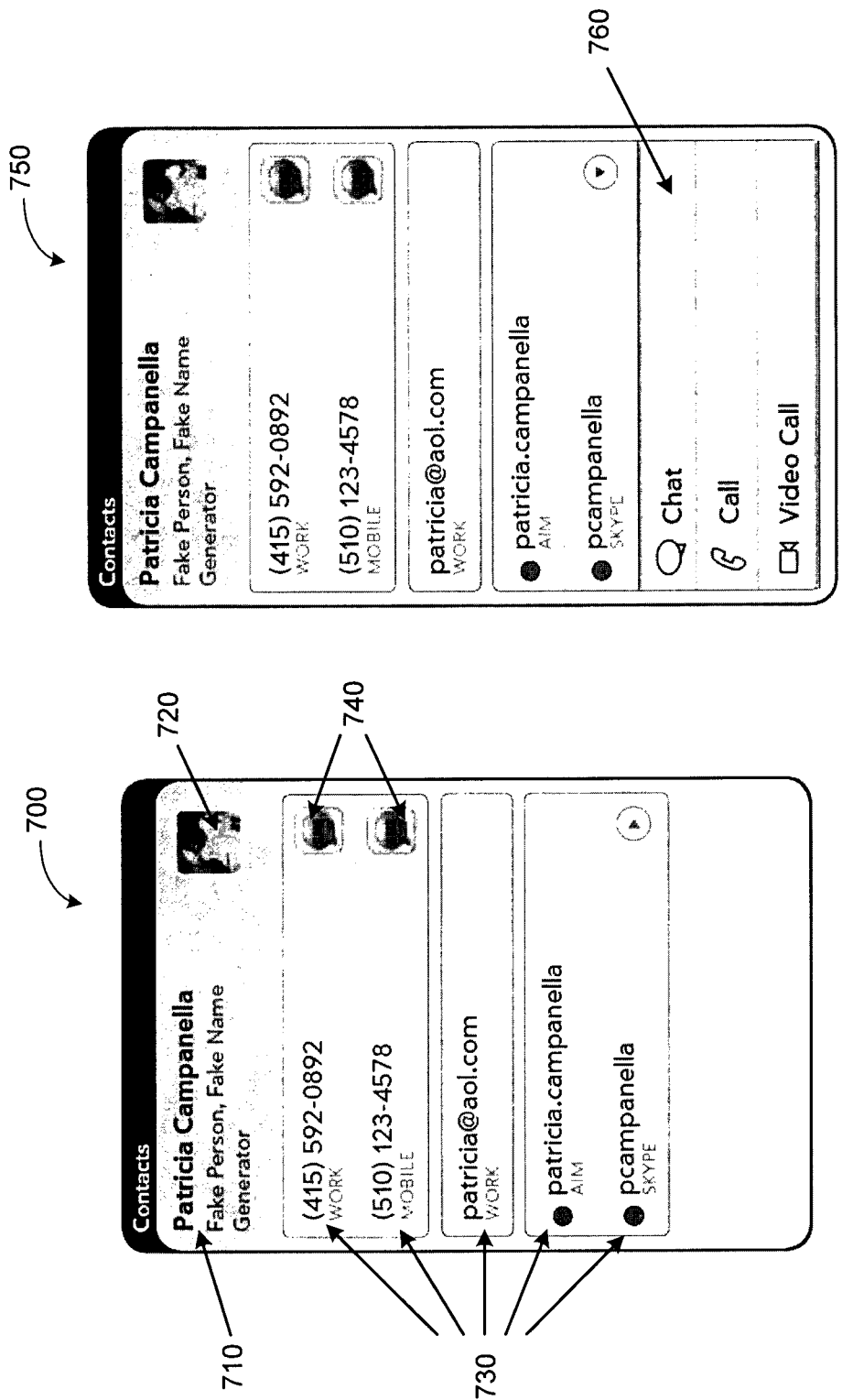
FIG. 7 illustrates a user interface for a contacts application, according to an embodiment.

FIG. 7 illustrates a user interface for a contacts application, according to an embodiment. View 700 illustrates a contact record for Patricia Campanella. The contact record includes a name 710 with an image 720 corresponding to the individual. The contact record also includes various record objects 730 with different contact identifiers and metadata associated with it (e.g., WORK, MOBILE, SKYPE, etc.). The record objects 730 includes telephone numbers, an option for SMS text messaging 740, an email address, and user names for AIM and SKYPE. From the contact record view 700, a user may select a record object 730 to initiate a communication session.

In some embodiments, a user may use a third party communication application and corresponding service transport (such as SKYPE) to call a phone number that is not a SKYPE account. For example, a SKYPE user may call a landline phone. According to one or more embodiments, when a user chooses to make a phone call (or video call), the system may automatically select a particular service transport to initiate the call. In view 700, if the user wants to call Patricia at her work number and selects the record object 730 for the work number, the mobile computing device may automatically select a service transport as a means for connecting the call (e.g., the carrier, or a third party application such as SKYPE or GOOGLE VOICE). The selection may be made in accordance with one or more communication parameters and/or selection rules. In other embodiments, the user may set his or her preferences so that the system selects the service transport the user wants.

Some parameters include available service transports, a transmission quality parameter, a reliability parameter, a communication protocol, a device capability, a voice or video service feature, cost value, a power parameter, a location, a calling region, a network scanning threshold parameter, a radio-frequency channel parameter, an access point parameter, a rate selection parameter, a frame size parameter, an aggregation size parameter, a packet retry parameter, a protocol parameter, a radio parameter, modulation and coding schemes, media access control layer parameter, physical layer parameter, and any other communication parameters affecting operations for a radio implemented by the mobile computing device.

In view 750, a user may expand the window 760 for the SKYPE record object so that the user may initiate a communication session using the SKYPE service transport and application. The user may message, voice call, or video call Patricia Campanella using the SKYPE application from the contacts application of the mobile computing device.

Figure 8:
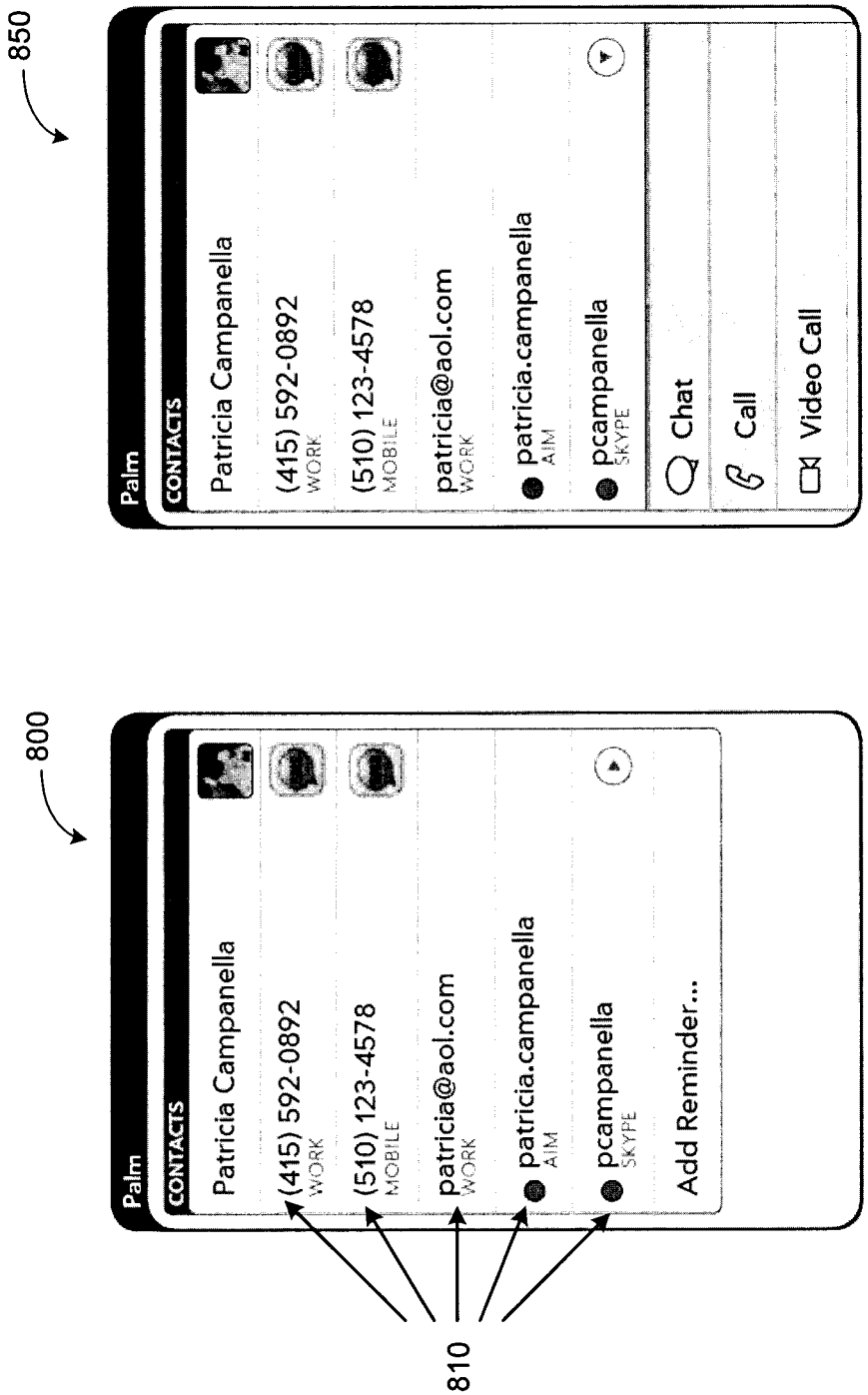
FIG. 8 illustrates a user interface for a search application, according to an embodiment.

FIG. 8 illustrates a user interface for a search application, according to an embodiment. In view 800, the search result for a query for "Patricia Campanella" is provided on the UI of a search application. In one embodiment, a user may start typing a search query (e.g., a phone number or someone's name) from the home page or home screen displayed on a mobile computing device. Upon selecting the search result for the input "Patricia Campanella," the details of the contact record for Patricia Campanella is provided with the search application UI. View 800 includes record objects 810 for different contact identifiers.

Like the other user interface illustrations provided for the other core applications, such as a phone application, messaging application and contacts application, a user may navigate the UI for a search application to select a service transport to initiate a communication session. In view 850, for example, the user has expanded the SKYPE record object 810 to see options available for communication sessions. According to an embodiment, from the search application UI, a user may choose a third party communication application and corresponding platform to either message, call or video call another user.

Figure 9:
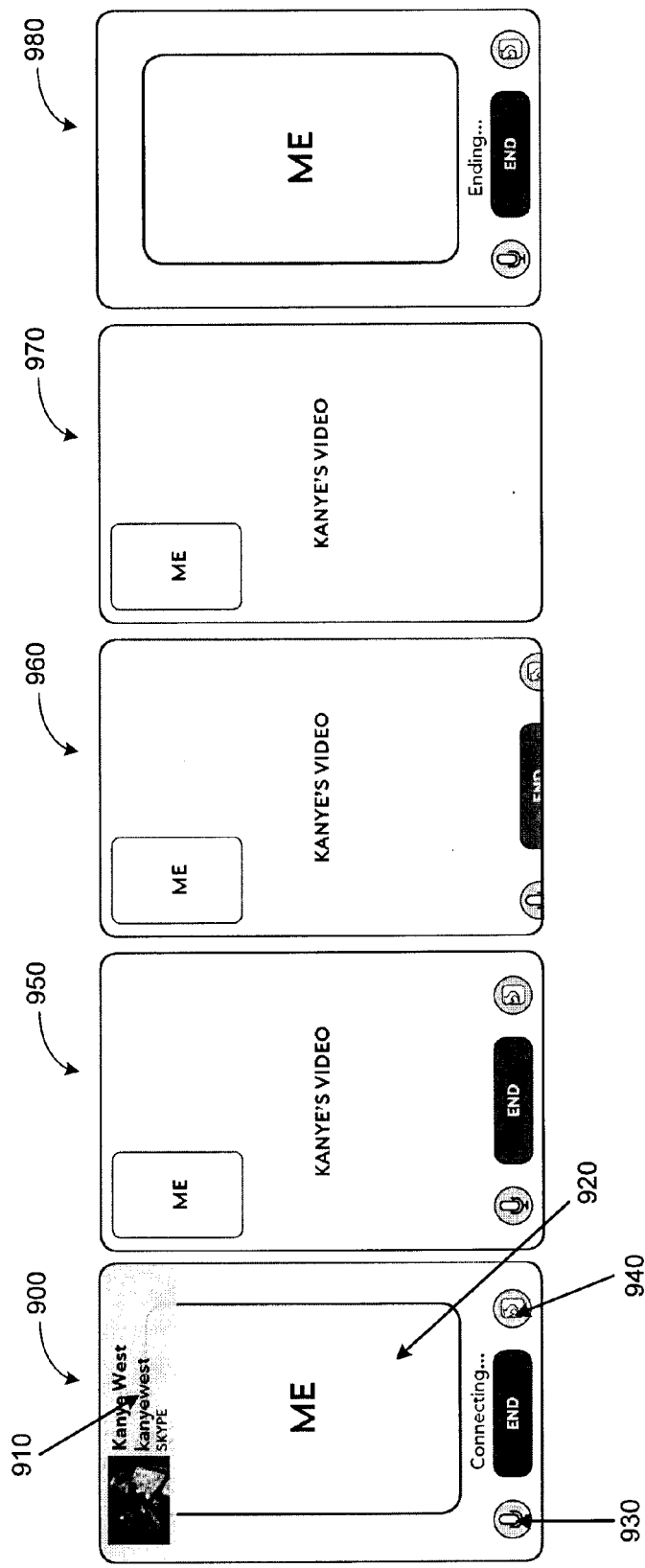
FIG. 9 illustrates a user interface for an ongoing video communication session under an embodiment.

FIG. 9 illustrates a user interface for an ongoing or active video communication session under an embodiment. In one embodiment, after a user has initiated a video communication session with another user from a core application, view 900 is provided on the display of the mobile computing device. View 900 is a UI showing that a video communication call between a user and Kanye West, for example, has been initiated. View 900 shows the name of the other user ("Kanye West") and the service transport that is being used to use the video calling service feature in a bar 910. The video of the user in window 920 ("ME") is first provided while the video call is being connected.

In some embodiments, a mobile computing device may have one or more video cameras (e.g., a device may have a front facing camera and a rear facing camera). The video shown in the window 920 may be the video from the front facing camera, so the user can see that what the other user will see on his or her device after the video call is connected. The UI also includes buttons for other options, such as a mute button 930 and a camera switch button 940. In one embodiment, when the user selects the camera switch button 940, the front facing camera will be turned off and the rear facing camera will be turned on (or vice versa). This example will be explained with FIG. 10 below.

In various embodiments, after the video call has connected, the UIs corresponding to views 950, 960 and 970 will be provided on the display of the mobile computing device. The active video call UI first shows view 950 after the video call has connected. In the example provided, the user may see his own face (from the front facing camera) in the window 955 on the left hand corner. Kanye's video (video showing Kanye's camera) is provided in view 950. The end button, the mute button 930 and the camera switch button 940 are still provided on the UI.

However, the command buttons may be hidden if the screen is not being tapped. While the video call is currently active and after a predetermined (or preselected) period of time, the command buttons will either fade or move away from the screen (see view 960 and 970). In some embodiments, once the user touches the screen (or enters in some other types of inputs), the command buttons may reappear on the screen (so that it looks like view 950 again).

In view 980, a UI for ending the video call is provided. View 980 is similar to view 900, except the UI displays the words "Ending . . . " instead of "Connecting . . . " like view 900. View 980 may be shown when the user ends the call or the other user on the other device ends the call. In some embodiments, although not illustrated in FIG. 9, after the video call has ended, view 980 may disappear and a UI for a core application that was used to initiate the video call may be provided (e.g., the call log UI of the phone application may be presented, with the just recently ended video call shown on top as the most recent record object).

Figure 10:
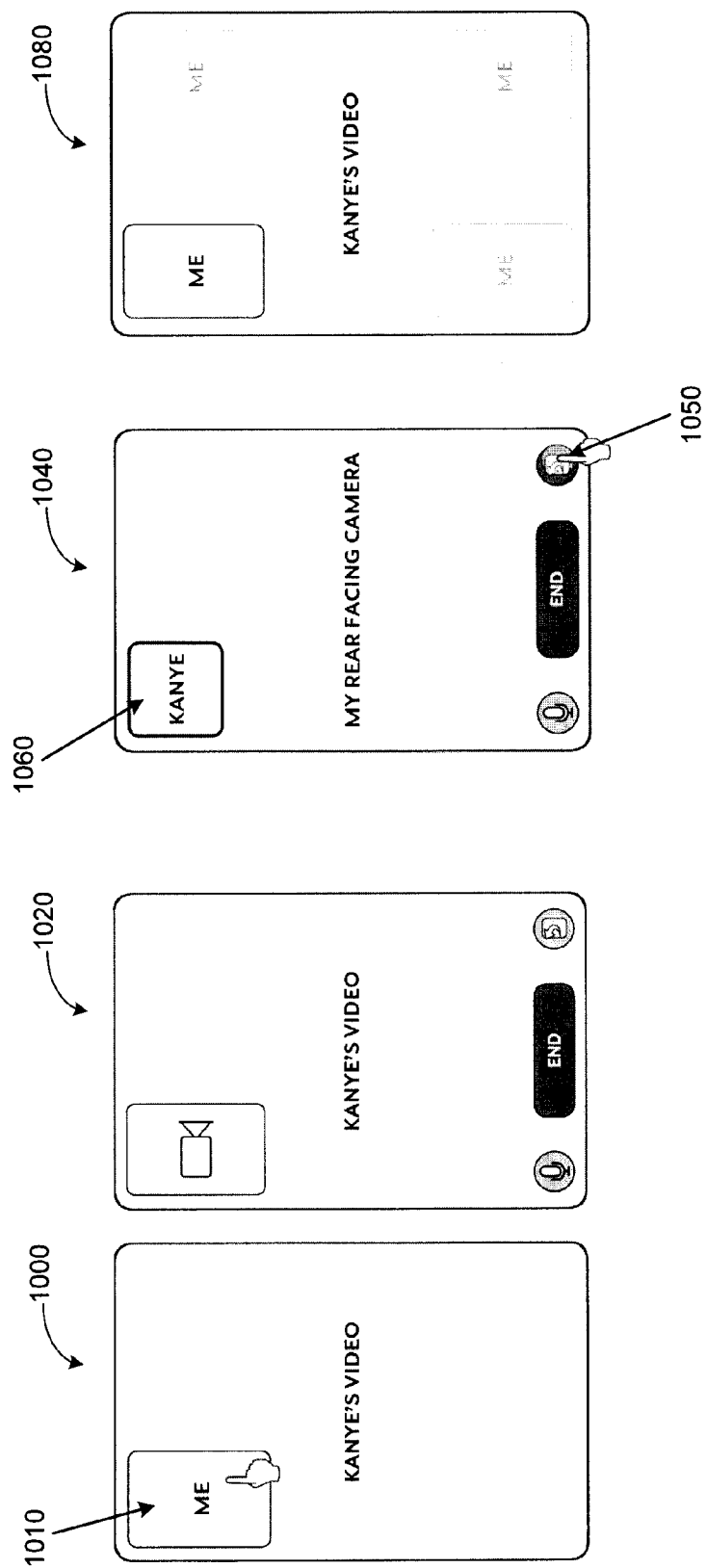
FIG. 10 illustrates a user interface for an ongoing video communication session under another embodiment.

FIG. 10 illustrates a user interface for an ongoing video communication session under another embodiment. In particular, the views of FIG. 10 illustrate the user of different options and command buttons of the UI for ongoing or active video calls. View 1000 shows an active video call between the user and Kanye West. The view from the user's front facing video camera is shown in window 1010. In one embodiment, the user may select the window 1010 to stop the video from being sent to the other user. However, the video from the other user (e.g., Kanye) is still sent to the user. In view 1020, the window 1010 shows a video icon because no more video is being sent. If the window 1010 is tapped again, video will be sent again to the other user.

In view 1040, the user has selected the command button for the camera switch button 1050. This button causes the front facing and rear facing cameras of the user's device to be switched. The button acts as an on/off toggle. Window 1060 may show the video of the other user. In the embodiment provided, the rear facing camera is shown in full screen view to show what the rear facing camera is capturing.

View 1080 illustrates another UI for an ongoing video call. In view 1080, a user may drag the window 1010 to various locations. In one embodiment, the user may drag the window 1010 to four different corners of the UI. In other embodiments, the user may drag the window 1010 to any location on the UI. Other embodiments are possible, such as allowing multiple windows 1010 and allowing different windows for the different cameras concurrently.

Figure 11:
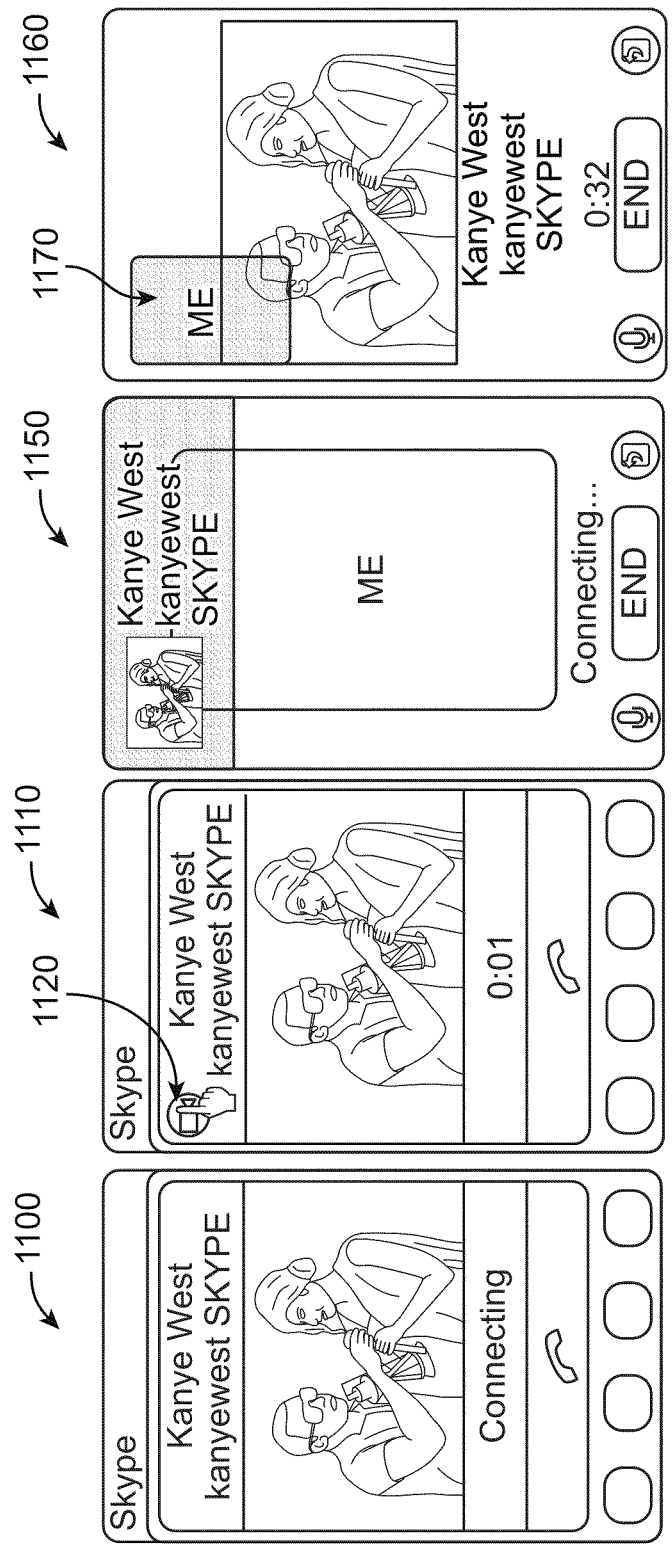
FIG. 11 illustrates a user interface for a video communication session that is initiated by a user of a mobile computing device, according to an embodiment.

FIG. 11 illustrates a user interface for a video communication session that is initiated by a user of a mobile computing device, according to an embodiment. In one embodiment, view 1100 may be provided after the user has selected SKYPE as the service transport for a phone call. In some embodiments, the user may have initiated a video call from a core application, but a phone call may first be initiated to begin the connection. In view 1100, a UI illustrates that the call is being connected.

In view 1110, after the call has been connected the time showing the duration of the connected phone call is shown. A video call icon 1120 is provided that tells the user that the phone call is a video enabled call, so that a user may switch back and forth from a voice call to a video call. Once the user selects the video call icon 1120, a phone call may be converted to a video call and the video call will start automatically without disconnecting from the phone call.

View 1150 shows a UI for a video call connecting. In some embodiments, while view 1150 is being presented as the UI on the display of the mobile computing device (e.g., while the video call is being connected), the user may still continue to speak with the other user through voice call. View 1150 is similar to that of view 900 of FIG. 9. View 1160 illustrates a UI for an ongoing video call. View 1160 is similar to that of view 950, except the user is not receiving a video from the other user (e.g., Kanye). In one embodiment, view 1160 may be provided if the other user has turned off video (but not the voice phone call) or if the other user does not have video capabilities while the user does. If the other user starts the video, his profile picture would be replaced with the video from his device. The user's video is shown in the window 1170 in the left hand corner.

Figure 12:
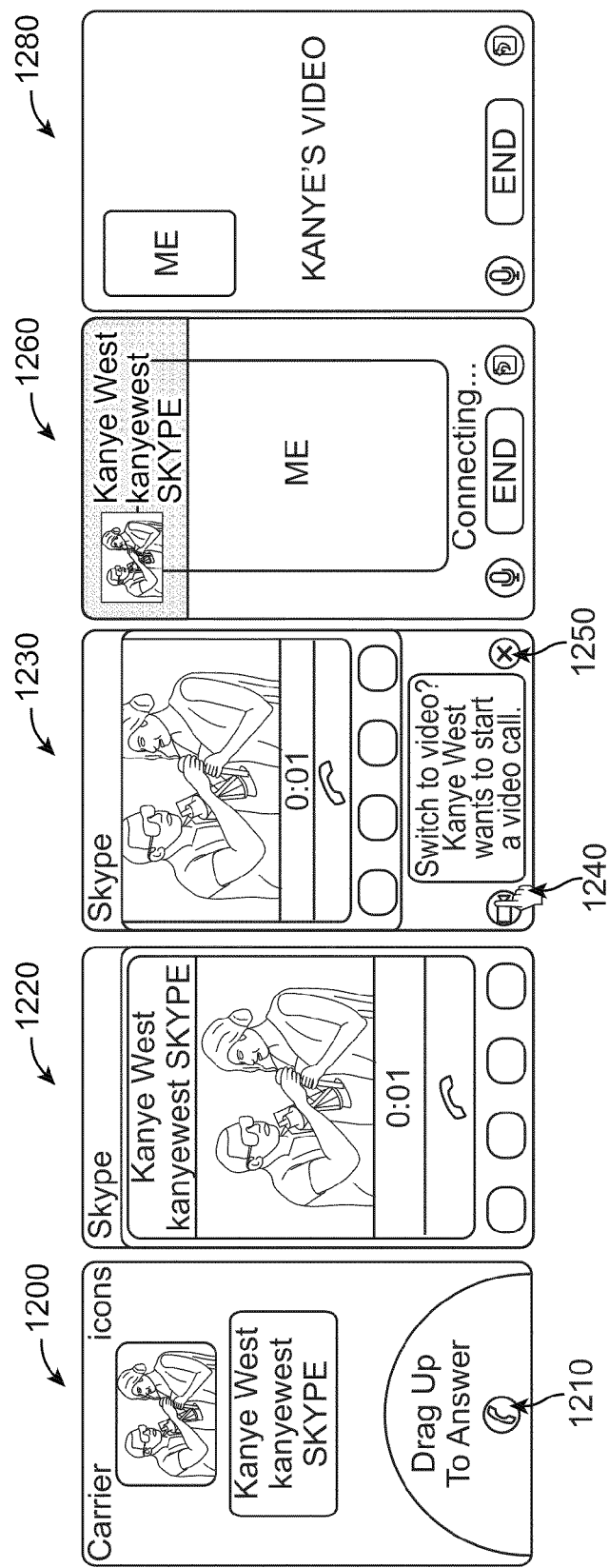
FIG. 12 illustrates a user interface for a video communication session that is received and answered by a user of a mobile computing device, according to an embodiment.

FIG. 12 illustrates a user interface for a video communication session that is received and answered by a user of a mobile computing device, according to an embodiment. View 1200 illustrates a UI that is provided when a user receives a phone call or video call. In some embodiments, a phone call must be made using the service transport before a video call can be made. In the example provided, the user may select and hold the icon 1210, and drag the icon 1210 above the semicircle in order to answer the phone call. Once the call is answered, the UI showing a connected phone call is provided in view 1220.

The other user who initiated the call may want to start a video call. If the other user requests a video call, the user receives a notification and has the option of accepting the video call or not. The option provided to the user is shown in view 1230. The user may select the video icon 1240 to accept the video call (the icon 1240 may be green in color, compared to red, for example) or select the reject icon 1250 to deny the request. Upon accepting the video call request, view 1260 is provided. The video call is being connected, and once the video call is connected, view 1280 is provided.

Figure 13:
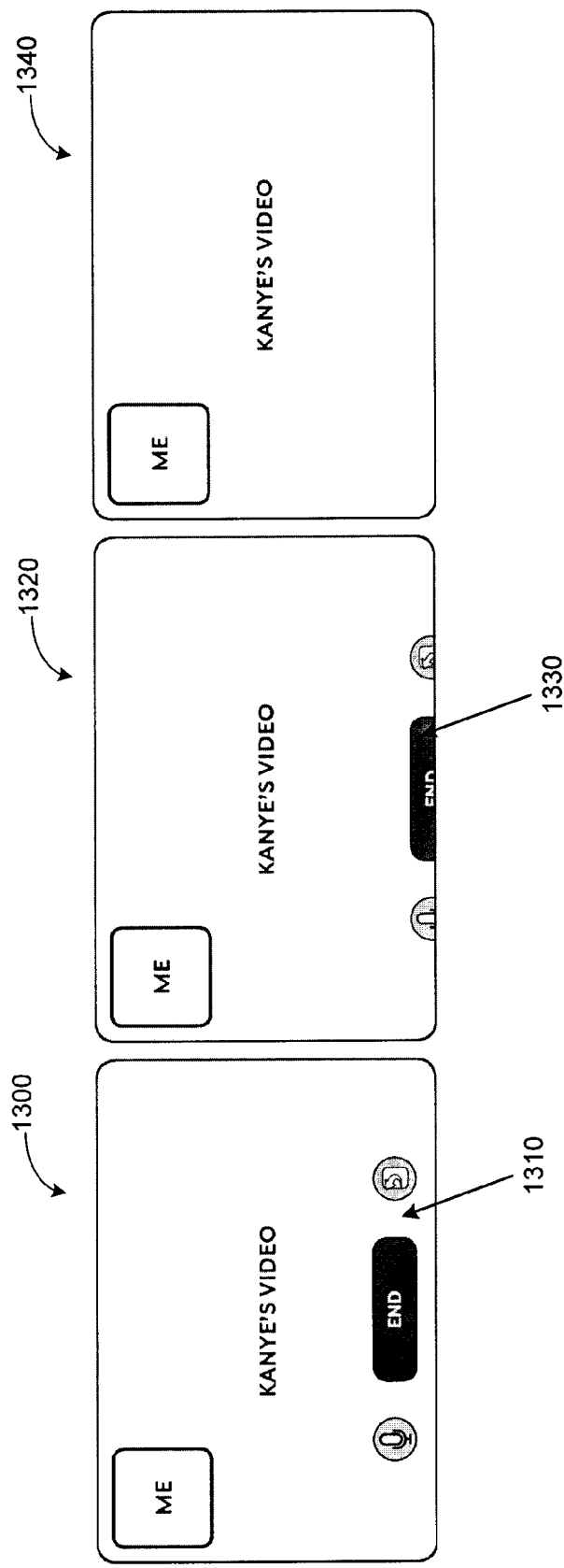
FIG. 13 illustrates a user interface for an ongoing video communication session, according to an embodiment.

FIG. 13 illustrates a user interface for an ongoing video communication session, according to an embodiment. During a video call, a user may turn the mobile computing device to view the video call in a different orientation. In the example provided, the user may view the video call in landscape mode, shown in view 1300. In the landscape mode, the command buttons 1310 may be provided on the bottom. In addition, as discussed previously, in some embodiments, the command buttons 1310 may fade in or shift downwards 1330 to disappear from the UI over time (see view 1320 and subsequent view 1340). The command buttons may reappear when the user taps on the screen or provides other input (e.g., from a keyboard). In another embodiment, the command buttons 1310 may not automatically disappear or fade out, but may do so upon a user input (e.g., such as a tap).

Figure 14:
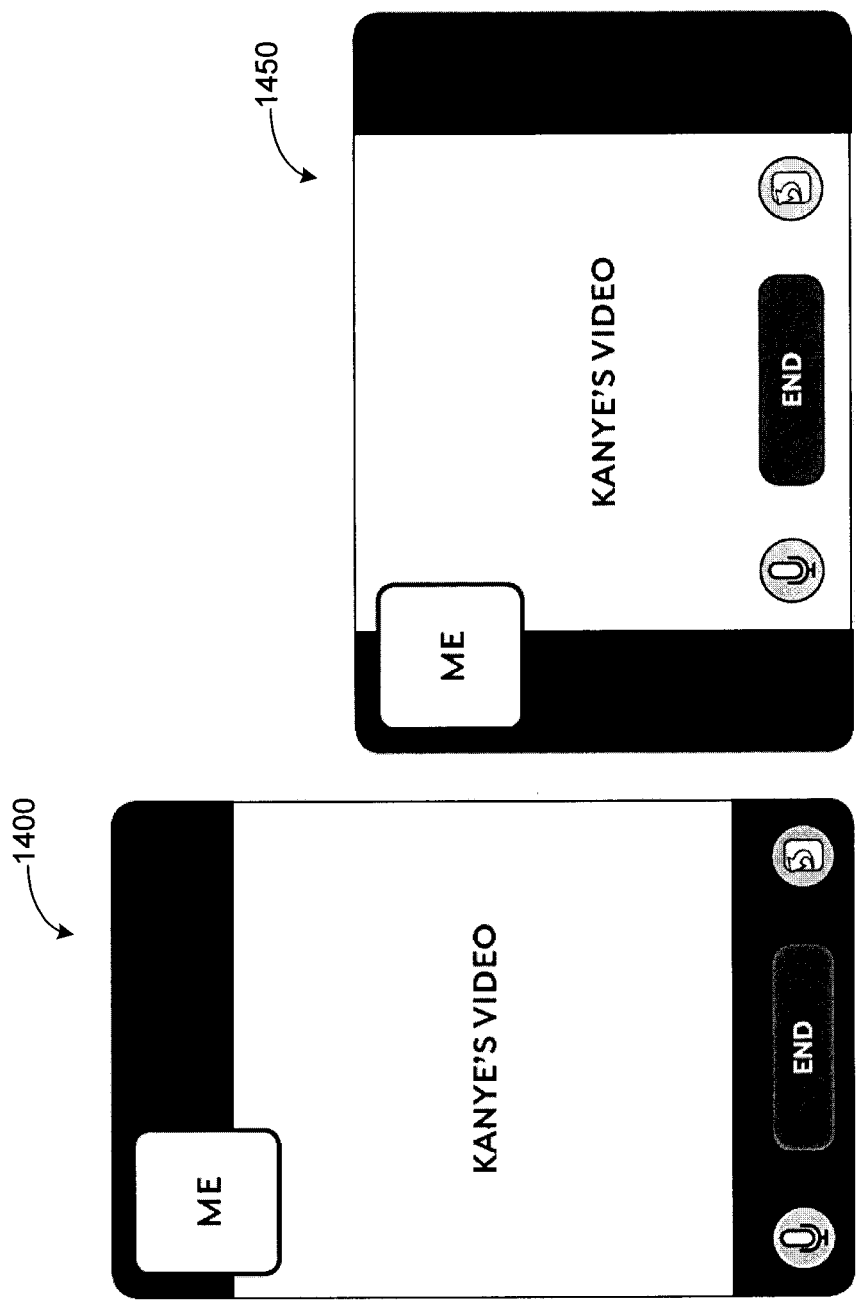
FIG. 14 illustrates a user interface for an ongoing video communication session, according to another embodiment.

FIG. 14 illustrates a user interface for an ongoing video communication session, according to another embodiment. In some embodiments, the video being received may be a different aspect ratio than the screen size. In this scenario, the UI for an ongoing video call may include black bars where there is no video. In view 1400, the mobile computing device is being held in a portrait orientation, while in view 1450, the mobile computing device is being held in a landscape orientation. Depending on the orientation and the aspect ratio, the black bars may change in size. In some embodiments, the window showing the user's camera view and the command buttons may remain in the same location. In other embodiments, the locations for the different items may be changed.

Figure 15:
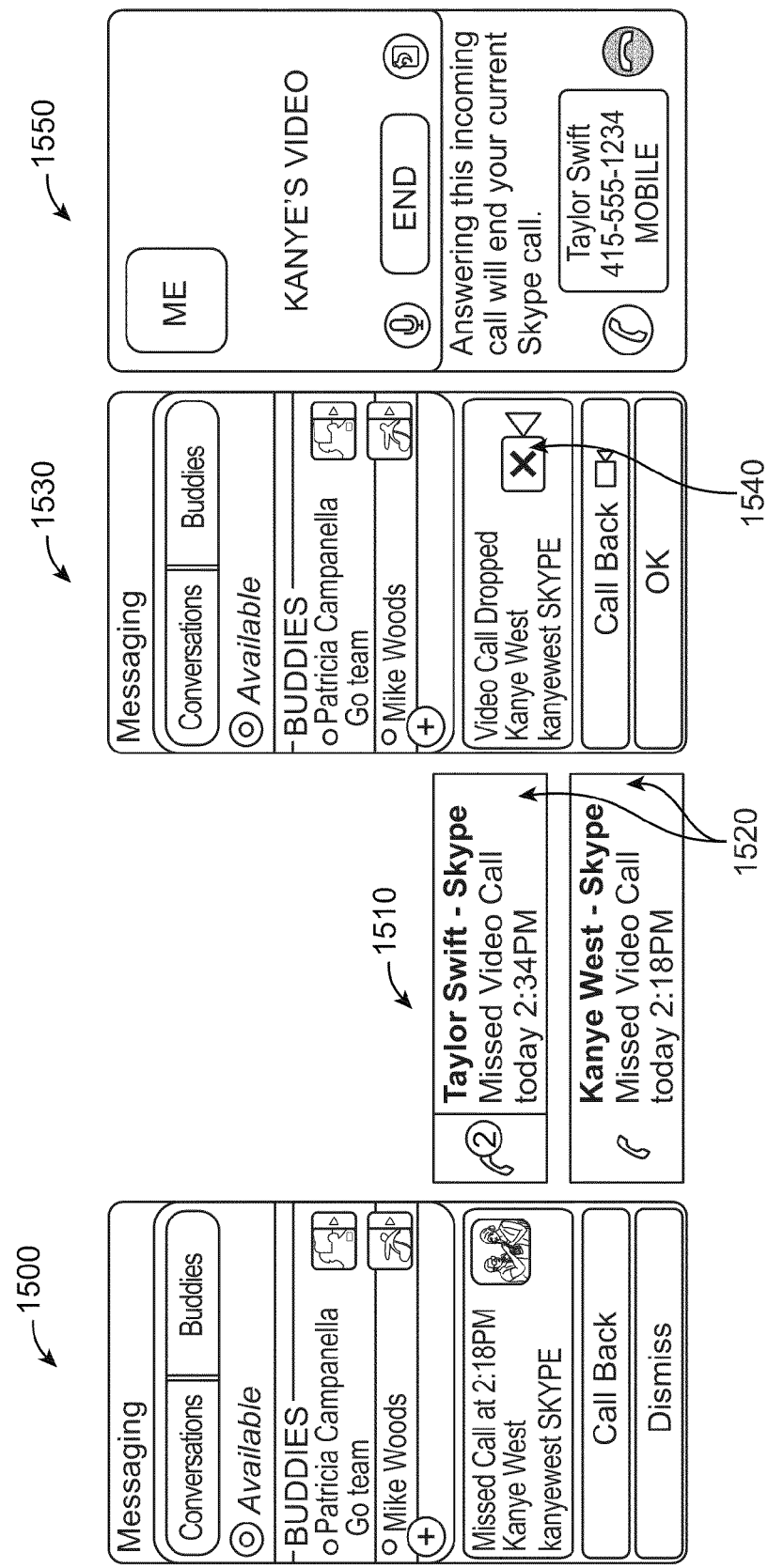
FIG. 15 illustrates a user interface for notifications under an embodiment.

FIG. 15 illustrates a user interface for notifications under an embodiment. In some embodiments, notifications for video calls using third party service transports may be similar to the notifications for phone calls (phone calls using a carrier transport or third party transport). However, there are differences to indicate whether a notification is for a phone call or a video call. In view 1500, a missed call notification is provided with options to directly call back or dismiss the notification. The notification shows the contact who called ("Kanye West"), the time, and the transport used (e.g., "SKYPE") to make the call. If the user selects the "Call Back" button, the user can directly dial the video call or phone call using the third party service transport and corresponding application (SKYPE, in this example). The top area shows a messaging application (e.g., the notification showed up when the messaging application was open) and tapping on that area will take the user to the messaging UI.

If a notification is dismissed, the missed video calls and phone calls become dashboard items 1520 on the home screen or home page of the mobile computing device. View 1510 illustrates a home page with two dashboard items 1520 represented two missed video calls. In another embodiment, a notification UI is provided for a dropped video call. The icon 1540 illustrates that the video call was dropped (video icon with an "X" through it). The user has the option to call back or just dismiss it ("OK"). Calling back will call the other person back using video call through use of the corresponding third party communication transport.

View 1550 illustrates a notification UI showing an incoming call while the user is on a video call. If the user is on a SKYPE video call with Kanye, for example, and a phone call comes in (from Taylor Swift), the user is given the option of either answering the incoming call or ignoring/rejecting it. The notification may provide information informing the user that answering the incoming call will end the current video call. In other embodiments, an incoming call while the user is on a call using a third party transport may automatically end that communication session.

Figure 16:
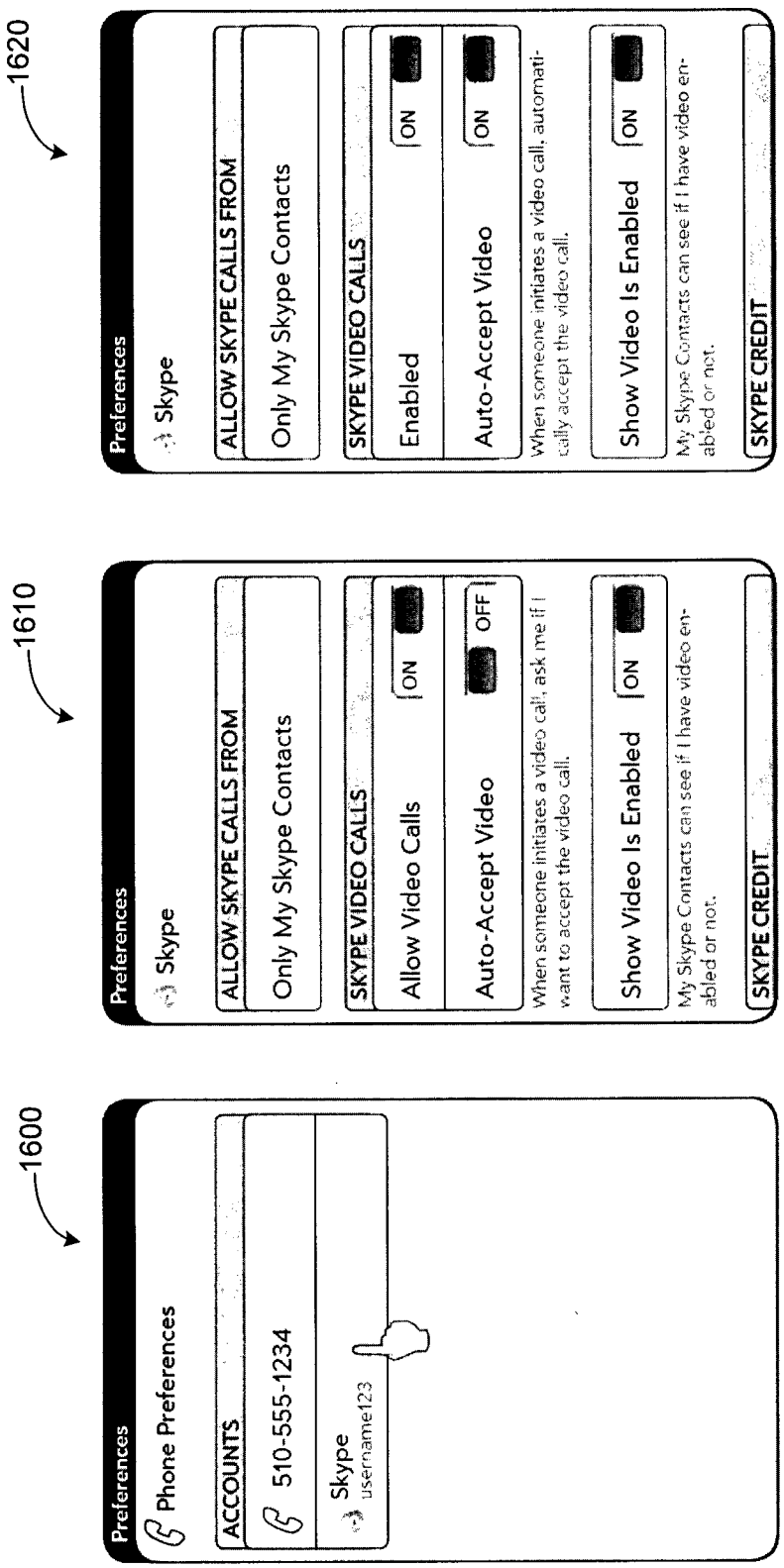
FIG. 16 illustrates a user interface for preferences, according to an embodiment.

FIG. 16 illustrates a user interface for preferences, according to an embodiment. View 1600 shows a UI for preferences for different transports available on the mobile computing device. In the example provided, the user has two transports for communication, the carrier and SKYPE, a third party service transport. If the user downloaded other third party communication applications corresponding to other communication service transports, such as GOOGLE VOICE, it would appear in view 1600. A user may select the SKYPE account to adjust the preferences for the SKYPE application.

In view 1610, a user may adjust different preferences for a third party communication application (e.g., SKYPE). The user may allow or prevent video calls, auto-accept video calls, or choose whether to allow other people to see if the user has video enabled or not when the user appears on other people's contact lists. The user may change these settings by tapping on the ON/OFF switch or dragging it from one direction to another. Other input methods are also available. In view 1620, the user has turned on all of the preferences for the SKYPE application.

Hardware Diagram

Figure 17:
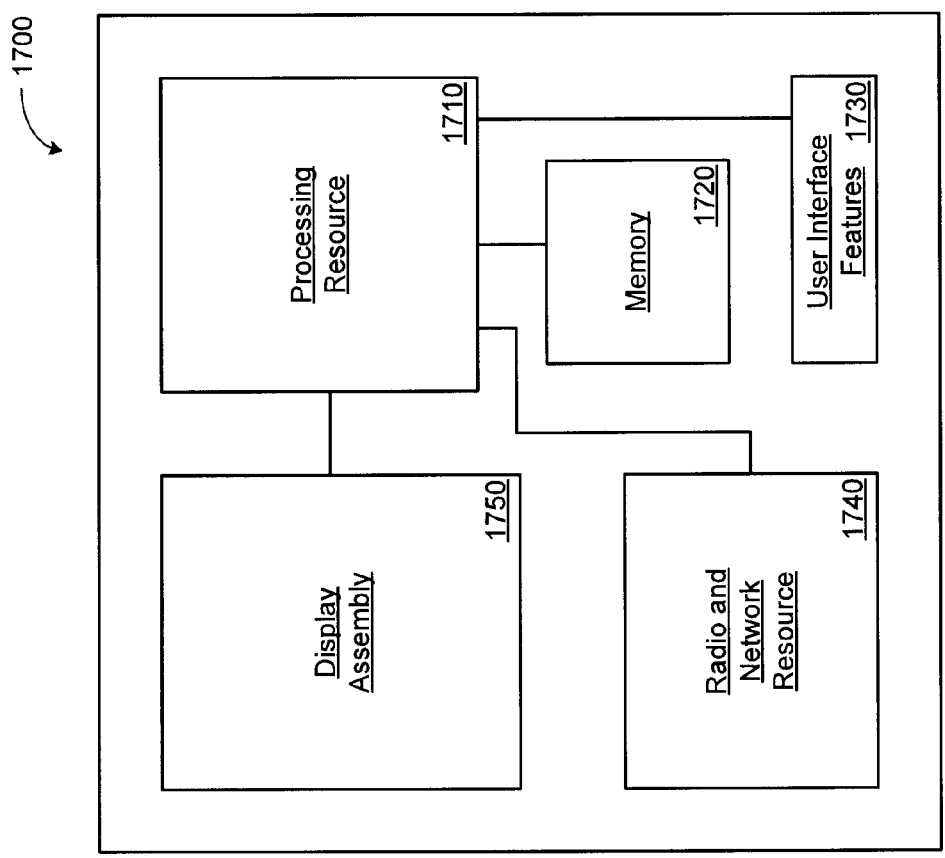
FIG. 17 is a simplified block diagram of a mobile device under an embodiment.

FIG. 17 is a simplified block diagram of a mobile device under an embodiment. In FIG. 17, a mobile computing device 1700 includes one or more processing resources 1710, one or more memory resources 1720 (e.g., Flash memory, RAM, hard drive, portable storage units, etc.), user interface features 1730 for enabling a user to control the mobile computing device 1700 with user inputs, a radio and network resource 640, and a display assembly 1750. In some embodiments, the user interface features 1730 may be incorporated with the display assembly 1750, such as a touch screen display. Other user interface features 1730 may include other inputs such as a keyboard, a scroll wheel, or a track ball.

The mobile computing device 1700 may also include a variety of different electrical components, but are not provided for simplicity. For example, the mobile computing device 1700 may also includes a battery for providing power to the mobile computing device 1700 and various communication ports, reset buttons, audio and video ports, speakers, and other features.

The processing resource 1710 is configured to execute instructions and process data for implementing the system and method as described with FIGS. 1 and 2, so that the mobile computing device 1700 can integrate third party communication applications with other core applications of the mobile computing device. The processing resource 1710 communicates with the memory resource 1720 to execute programs (and process data) that are stored in the memory resource 1720. The memory resource 1720 may store a service manager and may store one or more core applications and third party communication applications. The processing resource 1710 may retrieve and execute the program instructions, code or data from the memory resources 1720 to control the mobile computing device.

The processing resource 1710 is also coupled to the radio and network resource 1740 to communicate with other devices wirelessly. The radio and network resource 1740 enables network connectivity and/or cellular telephony capabilities. The radio and network resource 1740 may be configured to enable network connectivity or connectivity with other devices through use of the Wi-Fi protocol (e.g., IEEE 802.11(b) or (g) standards), Bluetooth protocol, etc. By using the radio and network resource 1740, the mobile computing device 1700 may access voice and video service features from a variety of different third party communication service transports (e.g., such as GOOGLE VOICE or SKYPE).

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A method for operating a mobile computing device, the method being performed by one or more processors and comprising:
    installing, on the mobile computing device, a third party communication application provided from a third party;
    presenting a user interface for a core application, the core application being provided as part of an operating system of the mobile computing device and corresponding to at least one of a phone application, a contacts application, or a messaging application, wherein by default, the core application provides a default user interface;
    presenting, based on determining that the third party communication application is installed on the mobile computing device, a modified user interface in place of the default interface of the core application including one or more user interface features for operating the third party communication application from the core application, wherein the one or more user interface features identify (i) a name of the third party communication application and (ii) a messaging transport type of the third party communication application; and
    executing the third party communication application in response to user interaction with the one or more user interface features of the core application.

2. The method of claim 1, wherein executing the third party communication application includes disabling or suppressing some of the user interface features of the third party communication application, unless the third party application is executed independent of the core application.

3. The method of claim 1, wherein the third party communication application includes a video communication application, and wherein when the third party communication application is executed, the video communication application initiates a video communication session.

4. The method of claim 3, wherein the user interface provides a selectable graphic representation for the third party communication application.

5. The method of claim 4, further comprising:
    enabling the user to switch from the video communication session to a voice communication session during a duration of the video communication session.

6. The method of claim 1, wherein determining that the third party communication application is installed on the mobile computing device includes determining that a contact record associated with the third party communication application corresponds to a contact record associated with the core application.

7. The method of claim 6, wherein the user interface corresponding to the phone application includes a call log that provides communication sessions initiated or received by the user using the one or more third party communication applications.

8. The method of claim 1, wherein the third party communication application uses a voice over packet protocol to enable a communication session.

9. The method of claim 1, wherein the third party communication application is previously downloaded from an application catalog by the user.

10. The method of claim 9, wherein the third party communication application modifies the user interface for the core application.

11. The method of claim 8, wherein the communication session is a voice communication session.

12. The method of claim 11, further comprising:
    enabling the user to switch from the voice communication session to a video communication session during a duration of the voice communication session.

13. A mobile computing device comprising:
    a display;
    one or more processors; and
    a memory resource for storing one or more third party communication applications, for storing one or more core applications, and for storing instructions that, when executed by the one or more processors, cause the mobile computing device to:

install, on the mobile computing device, a third party communication application provided from a third party;

present a user interface for a core application, the core application being provided as part of an operating system of the mobile computing device and corresponding to at least one of a phone application, a contacts application, or a messaging application, wherein by default, the core application provides a default user interface;

present, based on determining that the third party communication application is installed on the mobile computing device, a modified user interface in place of the default interface of the core application including one or more user interface features for operating the third party communication application from the core application, wherein the one or more user interface features identify (i) a name of the third party communication application and (ii) a messaging transport type of the third party communication application; and execute the third party communication application in response to user interaction with the one or more user interface features of the core application.

14. The mobile computing device of claim 13, wherein execution of the instructions to execute the third party communication application causes the mobile computing device to disable or suppress some of the user interface features of the third party communication application, unless the third party application is executed independent of the core application.

15. The mobile computing device of claim 13, wherein the third party communication application includes a video communication application, and wherein when the third party communication application is executed, the video communication application initiates a video communication session.

16. The mobile computing device of claim 15, wherein the user interface provides a selectable graphic representation for the third party communication application.

17. The mobile computing device of claim 16, wherein execution of the instructions further causes the mobile computing device to enable the user to switch from the video communication session to a voice communication session during a duration of a video communication call.

18. The mobile computing device of claim 13, wherein determining that the third party communication application is installed on the mobile device includes determining that a contact record associated with the third party communication application corresponds to a contact record associated with the core application.

19. The mobile computing device of claim 18, wherein the core application is a phone application, and a user interface corresponding to a phone application includes a call log that provides communication sessions initiated or received by the user using the third party communication application.

20. The mobile computing device of claim 13, wherein the third party communication application uses a voice over packet protocol to enable a communication session.

* * * * *